Patented June 5, 1923.

1,457,484

UNITED STATES PATENT OFFICE.

FREDERICK C. ATKINSON, OF INDIANAPOLIS, INDIANA.

METHOD OF PURIFYING ACID LIQUOR.

No Drawing.   Application filed May 27, 1919. Serial No. 300,129.

*To all whom it may concern:*

Be it known that I, FREDERICK C. ATKINSON, a citizen of the United States, residing at Indianapolis, in the county of Marion and State of Indiana, have invented certain new and useful Improvements in Methods of Purifying Acid Liquor, of which the following is a specification.

In the manufacture of food products from corn large quantities of cobs accumulate and the utilization thereof as a by-product has been the subject of considerable investigation by me. It is customary to subject cellular vegetable matter, such as corn-cobs to destructive distillation from which is obtained an acid liquor containing acetic acid and some other acetic and aldehyde bodies. Some tar is also obtained and a third product is gas, which is largely carbon-monoxid. The separation of the gas from this tar is a simple matter and done mechanically, and the separation of the tar from the acid liquor is also simple, being done mechanically. However, I find the acid liquor contains dissolved a further quantity of tar of an oily nature which is readily separated to a partial degree by "salting out." This salting out can be done by means of calcium chloride or sodium chloride, but I prefer the latter. The tar oil thus drawn out of the solution rises to the surface. I usually separate this acid liquor with sodium chloride, or common salt, and allow a few days for a complete separation of the tar layer. The lower acid layer is separated as a clear liquor with an acidity corresponding to approximately 5% acetic acid; but this acidity is influenced to a large degree by the original moisture in the corn-cobs. Wet corn-corbs give a more dilute acetic acid than is obtained in dry corn-cobs.

I have found that this salted out acetic acid liquor still contains certain substances which may be classed as impurities, which are not separated out by distillation and which are also very difficult to precipitate in insoluble form. The removal of these substances to at least a considerable degree and the resulting purification of the acid liquor is therefore the subject of my present invention.

I accomplish this by adding to the liquor containing said substances a quantity of animal skins, or other nitrogeneous animal matter, which have an affinity for these certain impurities of the acid liquor. By the use of sufficient animal matter or skins I obtain a liquor partially decolorized and which on distillation yields an acetic acid partially purified and which may be converted into a salt of acetic acid by simply adding a basic chemical to neutralize the acid and evaporating it to dryness. In addition to partially purifying the acetic acid liquor I find that the skins, or other nitrogeneous organic matter, have chemically combined with the substances to be removed from the acid liquor and when skins are used the resulting product is leather. In order to complete the tanning operation, or the formation of leather in the most advantageous manner, certain other steps are required and I have therefore made my discovery of the utilization of this liquor for tanning hides the subject matter of a separate application and desire herein to claim broadly the invention which consists in the purification of the acid liquors by depositing therein quantities of animal matter, animal skins being used herein merely as a sample of such animal matter, and as illustrating one species thereof which may be used successfully for the purpose.

Having thus fully described my said invention, what I claim as new and desire to secure by Letters Patent, is:

1. The process of removing certain objectionable organic substances from impure acetic acid obtained by the destructive distillation of corn-cobs, which consists in depositing in said liquor a quantity of animal matter composed of skins, tissue or cartilage which has an affinity for said substances or impurities.

2. The process of purifying acid liquors obtained from a destructive distillation of corn-cobs, which consists in depositing therein animal matter of untreated skins, tissue or cartilage, substantially as set forth.

3. The process of removing impurities from acetic acid liquor obtained by destructive distillation of corn-cobs, which consists in subjecting said liquor to contact with animal matter consisting of parts of an animal carcass in its natural state having an affinity for said impurities.

4. The process of removing impurities from acetic acid liquor obtained by the destructive distillation of cellular vegetable matter which consists in subjecting said liquor to contact with animal matter embodying parts of an animal carcass in their natural state having an affinity for said impurities.

In witness whereof, I have hereunto set my hand and seal at Indianapolis, Indiana this 20th day of May, A. D. nineteen hundred and nineteen.

FREDERICK C. ATKINSON. [L. S.]

Witness:
   M. L. SHULER.